O. D. COLLIS.
CEMENT REINFORCEMENT.
APPLICATION FILED AUG. 31, 1914.

1,269,553.

Patented June 11, 1918.

Witnesses
Philip E. Barnes
James Atkins

Inventor
Oliver D. Collis
By Edmund H. Parry
Attorney

UNITED STATES PATENT OFFICE.

OLIVER D. COLLIS, OF CLINTON, IOWA, ASSIGNOR TO THE COLLIS CO., OF CLINTON, IOWA, A CORPORATION OF IOWA.

CEMENT-REINFORCEMENT.

1,269,553.     Specification of Letters Patent.     Patented June 11, 1918.

Application filed August 31, 1914. Serial No. 859,371.

*To all whom it may concern:*

Be it known that I, OLIVER D. COLLIS, a citizen of the United States, residing at Clinton, in the County of Clinton and State of Iowa, have invented certain new and useful Improvements in Cement-Reinforcements, of which the following is a specification, reference being had therein to the accompanying drawing.

This invention relates to concrete structure and more especially to a cement-pipe reinforcement.

The primary object of the invention is to produce a structure of the kind specified which shall possess great strength to withstand crushing and other strains which may be imposed upon it, and be free from cracks, or practically so.

A further object is to produce a reinforced cement pipe structure in such an economical manner that it may be profitably marketed and installed.

A further object is to produce a reinforced cementitious mass, in the form of pipe, reinforced by a fabricated metallic structure of great serviceabilty, and capable of withstanding relatively great strains and impacts.

A further object is to produce, in an economical manner, a cement-pipe of appropriate diametral dimensions and thickness, and reinforced by a fabricated metallic structure comprising a plurality of spaced members and instrumentalities welded together at predetermined points so that any line or lines of crushing strain will be intersected by one or another of said members and instrumentalities.

The invention in general seeks to provide a reinforced cement-pipe which is particularly adapted for conduits of relatively large diameter and great length, and which structure, from an operative standpoint, will, in practical use, possess a high degree of efficiency and durability and which, structurally considered, will be of the greatest simplicity.

The invention resides broadly in the features of construction, in the combinations of elements, and in the particular relative arrangement and aggroupments thereof, all as will be exemplified in the construction hereinafter set forth, and the scope of application of which will be indicated in the claims hereto annexed.

That the invention may be more clearly comprehended, I append hereto drawings illustrating a possible utilization of the invention—in this instance the same being a pipe—it being understood, of course, that other possible embodiments and utilizations (employing the underlying principles of the invention) fall within the spirit thereof and within the objects contemplated thereby.

Figure 1:
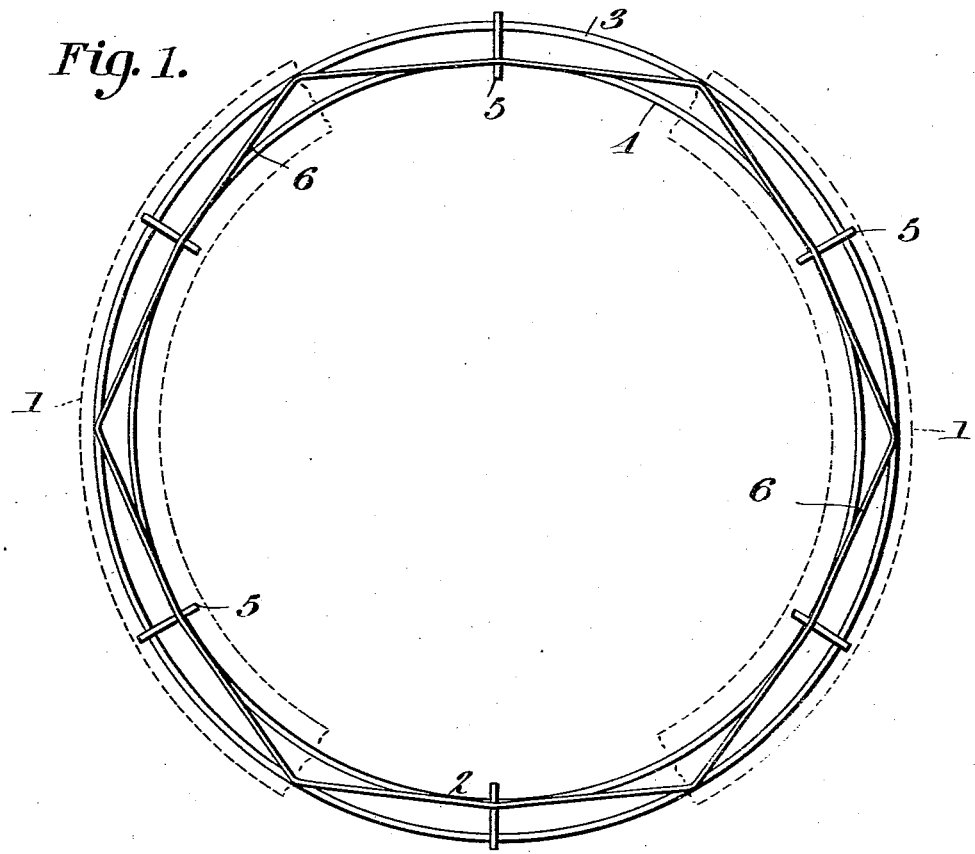
Figure 2:
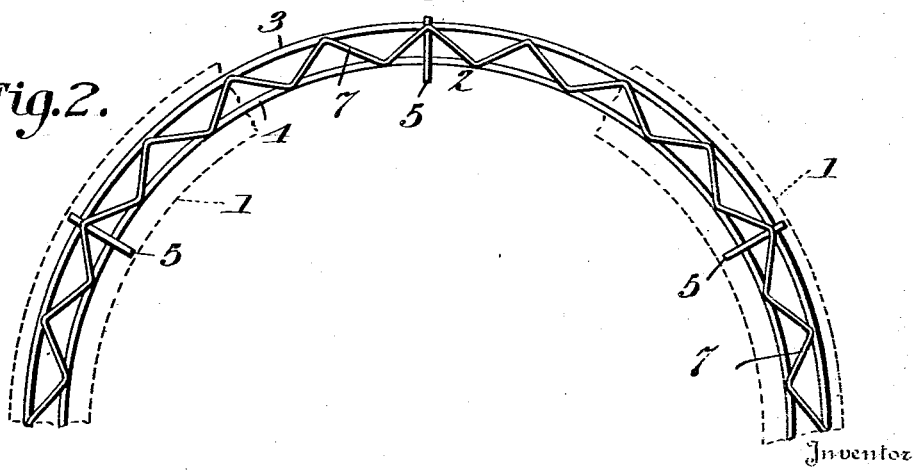

In these drawings:

Figure 1 is a view in elevation of a form of reinforcement embodying my invention; and Fig. 2 is a similar view of a different form and, for some purposes, a preferable type.

Referring to the drawings, it will be noted that the reference-numeral 1 designates a mass of plastic material, such as cement formed, in this instance, as an annulus to constitute a section of pipe, for example. It may be of any desired thickness and of appropriate diametral dimensions.

Embedded in the cementitious mass— while the same is in a plastic condition—is a fabricated reinforcing structure designated, generally, by the reference-character 2 and which is preferably though not necessarily of metal.

The reinforcing structure preferably comprises two annular members 3 and 4 which (in this instance) are in the form of hoops and formed of any suitable material, such as steel wire of a gage ample to give strength and rigidity. The ends of the wire, when bent to form the hoop, are secured together, as by welding.

The hoop or member 3 is of larger diameter than the hoop or member 4 and when these instrumentalities are grouped, as shown, the former encompasses the latter and is spaced therefrom.

To maintain the hoops in proper spaced relation, to tie them together, and to brace them, a series of radial tie-elements 5 are secured at their ends to each of the hoops, as by welding, and are spaced from each other.

This type of reinforcement presents a simple but efficient structure. In some instances, however, it may be desirable or necessary to provide a structure capable of withstanding greater stresses or strains— crushing strains, for instance: In Fig. 1 I have disclosed another practical arrangement with this end in view. In this instance, in addition to the tie-elements 5, forming a part of the embodiment already described. I provide a series of tangential connecting-elements or truss-wires 6, these being welded or otherwise secured to the spaced hoops at predetermined points. As shown, these connecting-elements or truss-wires occupy a tangential position relatively to the hoops and at an angle—in this instance, approximately at right angles—to the tie-elements. The combination of the radial and tangential elements presents a structure capable of immense resistance.

As a carrying forward of this second type of reinforcement, I have, in Fig. 2, shown a modification which, for most purposes, is a preferred form for the reason that, as practice and very severe tests have demonstrated, it is capable of withstanding crushing and other strains greater than any similar form of structure heretofore proposed, so far as I am now aware. In this instance, a greater number of truss-wires 7 are employed than in the embodiment just described. These are welded or otherwise secured to the spaced hoops 3 and 4 at points on the one intermediate of points on the other. Moreover, in this type, a plurality of these truss-wires are interposed between the radial tie-elements 5.

This fabricated reinforcement, whatever its form, is constructed, complete, before being embedded in or made a part of the mass of cement. Preferably, in practice, the inner hoops are spaced, say, ⅜ths of an inch from the inner wall of the pipe, while the outer hoop is disposed, say, a half inch from the outside surface thereof.

This fabricated structure is such that it not only effects reinforcement of the cement formation to a remarkable degree, as skilfully made tests have demonstrated, but it and the embodying cement act as a unit, since there is a bond of high degree between the cement and the metal.

From the foregoing, it will be perceived that I have succeeded in devising a reinforced cement-structure which is well adapted to achieve the several objects and ends in view. The structure is simple and compact in form; the parts of which the fabricated structure is constituted are simple and easily and economically produced; and they are readily welded together, as by well-known electric welding methods.

As many changes can be made in the described construction and many widely different embodiments of this invention can be provided without departing from the spirit thereof, it is intended that all matter contained in the foregoing description and shown in the accompanying drawings shall be interpreted as illustrative and not in a limiting sense. It is also to be understood that the language used in the appended claims is intended to cover all of the features of the invention, in the generic as well as in the specific sense.

What I claim is:

1. A reinforcing instrumentality for concrete structures, comprising an outer member; an inner member surrounded by and in approximately the same radial plane as said outer member; a plurality of oppositely disposed radial tie members connecting said inner and outer members; and a plurality of cross braces welded to said inner and outer members and to said tie members.

2. A reinforcing instrumentality for concrete structures, comprising an outer member; an inner member surrounded by and in approximately the same radial plane as said outer member; a plurality of oppositely disposed radial tie members connecting said inner and outer members; and a plurality of cross brace members disposed in angular relation to said oppositely disposed radial tie members and approximately tangentially to one of said members, said brace members being welded to both inner and outer members and said radial tie members.

3. A reinforcing instrumentality for concrete structures, comprising a plurality of circular wire members arranged one within the other and in approximately the same radial plane; oppositely disposed radial tie members in approximate alinement welded to said inner and outer members and extending beyond said members on opposite sides thereof; and a series of cross brace members some of which are arranged tangentially to said inner member, at right angles to said radial tie members, and having a portion in engagement with said outer member; said inner and outer members, radial tie members and cross braces being welded together to form an integral structure.

4. As an article of manufacture a concrete unit comprising a tubular cementitious mass and a reinforcing structure embedded therein and including a reinforcing instrumentality comprising a plurality of circular wire members arranged one within the other and in approximately the same radial plane; oppositely disposed radial tie members in approximate alinement welded to said inner and outer members and extending beyond said members on opposite sides thereof; and a series of cross braces some of which are arranged tangentially to said inner member, at right angles to said radial tie members and having a portion in engagement with said outer member; said inner and outer members, radial tie members and cross braces being welded together to form an integral structure.

In testimony whereof I affix my signature in presence of two witnesses.

OLIVER D. COLLIS.

Witnesses:
FRIEDA E. TRITSCHLER,
ANNA BLAAS.